US007257207B2

(12) United States Patent
Ruckart et al.

(10) Patent No.: US 7,257,207 B2
(45) Date of Patent: *Aug. 14, 2007

(54) METHOD AND SYSTEM FOR PAYING PREPAID COMMUNICATIONS CREDIT

(75) Inventors: John Ruckart, Atlanta, GA (US); Rimas Rauba, Roswell, GA (US); Jerome Wendell Myers, Douglasville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 151 days.

This patent is subject to a terminal disclaimer.

(21) Appl. No.: 11/084,914

(22) Filed: Mar. 21, 2005

(65) Prior Publication Data

US 2005/0163295 A1    Jul. 28, 2005

Related U.S. Application Data

(63) Continuation of application No. 10/008,511, filed on Nov. 8, 2001, now Pat. No. 6,950,506.

(51) Int. Cl.
*H04M 15/00* (2006.01)
(52) U.S. Cl. .............................. 379/114.2; 379/114.15; 379/114.16; 379/144.01
(58) Field of Classification Search ........... 379/114.01, 379/114.15, 114.16, 114.17, 114.19, 114.2, 379/114.24, 114.25, 114.26, 144.01; 455/405–408; 705/14
See application file for complete search history.

(56) References Cited

U.S. PATENT DOCUMENTS

| 4,776,004 A | 10/1988 | Bauer et al. |
| 5,409,092 A | 4/1995 | Itako et al. ................. 194/210 |
| 5,436,957 A | 7/1995 | McConnell |
| 5,719,926 A | 2/1998 | Hill |
| 5,825,863 A | 10/1998 | Walker |
| 5,864,604 A | 1/1999 | Moen et al. |
| 5,903,633 A | 5/1999 | Lorsch .................... 379/114.2 |
| 6,026,291 A | 2/2000 | Carlson et al. |
| 6,122,354 A | 9/2000 | Dowens .................... 379/114.2 |

(Continued)

FOREIGN PATENT DOCUMENTS

DE    19819582 A1    4/1998

(Continued)

OTHER PUBLICATIONS

Patent-Pending SmartTouch (SM) Technology Gives Consumers Complete Control Over Long Distance Spending, article at www.currentanalysis.com, May 11, 2000.

(Continued)

*Primary Examiner*—Binh K. Tieu
(74) *Attorney, Agent, or Firm*—Merchant Gould PC

(57) ABSTRACT

A method and system for prepaying credits to a user account for communications services is provided. A system receives an origination number and a code. The code corresponds to a predefined payment amount for prepaid credit. The system credits an account associated with the origination number with the predefined payment amount for prepaid credit. Software for implementing the method and system may be implemented in a number of environments, including a computer system accessible remotely or a processor located on a user communication device.

24 Claims, 8 Drawing Sheets

U.S. PATENT DOCUMENTS

| | | | |
|---|---|---|---|
| 6,188,752 B1 | 2/2001 | Lesley | 379/114.16 |
| 6,195,422 B1 | 2/2001 | Jones et al. | 379/127.05 |
| 6,377,938 B1 | 4/2002 | Block et al. | |
| 6,393,275 B1 | 5/2002 | Alfred | |
| 6,502,745 B1 | 1/2003 | Stimson et al. | 235/375 |
| 6,542,590 B1 | 4/2003 | Player et al. | 379/114.26 |
| 6,546,238 B1 | 4/2003 | Nightingale et al. | 455/406 |
| 6,581,827 B2 | 6/2003 | Welton | 235/380 |
| 6,707,894 B1 | 3/2004 | Halford | 379/114.2 |
| 6,793,135 B1 | 9/2004 | Ryoo | 235/383 |
| 2003/0043984 A1 | 3/2003 | Lauzon | 379/144.01 |

FOREIGN PATENT DOCUMENTS

| | | |
|---|---|---|
| EP | 0400911 A2 | 5/1990 |
| EP | 0585004 A2 | 8/1993 |
| GB | 2355134 A | 4/2001 |
| WO | WO93/20664 A1 | 10/1993 |
| WO | WO96/38801 | 5/1996 |
| WO | WO96/41462 | 12/1996 |
| WO | WO98/47112 | 10/1998 |
| WO | WO98/56160 A1 | 12/1998 |
| WO | WO00/77747 A1 | 12/2000 |
| WO | WO02/41619 A1 | 5/2002 |

OTHER PUBLICATIONS

New Bell Atlantic Product Redefines Long Distance, product announcement, Jun. 1, 2000.

USAN Services, webpage printed from www.unsinc.com, Apr. 2, 2001.

Official Action Issued by the Patent Office dated Sep. 29, 2003 related U.S. Appl. No. 10/008,888.

Official Action Issued by the Patent Office dated Apr. 21, 2004 related U.S. Appl. No. 10/008,888.

Official Action Issued by the Patent Office dated Nov. 23, 2004 related U.S. Appl. No. 10/008,888.

METHOD AND SYSTEM FOR PAYING PREPAID COMMUNICATIONS CREDIT

CROSS REFERENCE TO RELATED APPLICATIONS

This application is related to co-pending application Ser. No. 10/008,888, entitled, "Method and System for Prepaid Communications Credit," which is hereby incorporated by reference, and this application is a continuation of co-pending application Ser. No. 10/008,511, entitled "Method and System for Paying Prepaid Communications Credit" filed on Nov. 8, 2001, now U.S. Pat. No. 6,950,506 which is hereby incorporated by reference.

FIELD OF THE INVENTION

The invention relates to a system and method for allowing users to prepay credit for use in a communications network, such as a wired or cellular telephone network.

BACKGROUND

Communications service providers, such as telephone service providers, employ various methods of charging users for communications usage within a communications network. One method of charging users for communications includes a per minute rate. For example, if a telephone user makes a long distance telephone call, the user is charged a rate per minute multiplied by the number of minutes that the telephone call lasts. One common practice is to change the per minute rate based on the destination of the telephone call and/or the time of day. For example, telephone calls within a country are typically cheaper per minute than calls from one country to another, and telephone calls during daytime hours, e.g., 9:00 a.m. to 5:00 p.m., are typically more expensive than calls during evening hours, e.g., 5:00 p.m. to 9:00 a.m.

Users who pay for communications services using a per-minute method often have difficulty determining how much money they have spent for communications services until they receive a billing statement from the communications company. In order to keep track of communications costs from day-to-day, the user must know how much time is spent using the communications services and the per minute rate. It is difficult and inconvenient for users to keep track of how much time is spent using a communications network, and the multiple rates charged by the communications provider are also difficult for a user to track. While users often know domestic telephone per minute rates, they may not know all international rates without contacting the telephone service provider. If users are surprised by a large billing statement, they may become dissatisfied with the communications services provider and hesitant to use the services without being able to track the costs.

Another conventional method for charging users for communications includes allowing the user to pay a periodic fee for a certain amount of communication usage. This method is particularly common in selling cellular telephone service. When such a method is employed, a user typically pays a monthly fee for a predefined number of "minutes" of telephone use in a predefined geographic area. If the user uses more than the predefined number of minutes or makes calls outside the predefined geographic area, the user is charged a per minute rate for the telephone calling time in addition to the monthly fee.

Users who pay for communications services with this certain-amount method also have difficulty determining how much money has been spent on telephone calls or other communications services once the prepaid services are used and the per minute rate is charged. In addition, such users often pay for more services than they use in a month. In typical certain-amount plans, if minutes are not used during the month, the minutes cannot be used at a later time. Some users would prefer to pay only for the time that they use.

Some users may have bad credit or non-existent credit and, therefore, would be a credit risk to a communications company charging per minute rates that are due after the communications services are delivered. Telephone companies often "toll block" these users. In other words, users who are deemed a credit risk are not allowed to make long distance or other calls requiring a toll or fee.

Many users who are "toll blocked" purchase prepaid calling cards. Prepaid service often eliminates the need to demonstrate good credit because the services are paid up front. However, such cards are often inconvenient for users for a number of reasons. Prepaid calling cards require that a user first dial an access code to access the prepaid account. The user is sometimes required to first dial a "toll free" phone number to enter the code. Because many cards and accounts may be offered by the same communications provider, the codes are often long and cumbersome to dial. In addition, such prepaid calling cards are not associated with an individual, and therefore, cannot be used to create a credit history.

One solution to some of these problems involves allowing users to pre-purchase credits that are used only if a call is made from a predefined telephone line. See U.S. Pat. No. 6,195,422. This method includes adding pre-purchased credits to an account that corresponds to a predefined telephone number. If a call is made from the predefined telephone number, the cost of the telephone call is deducted from the account amount. Users have many of the advantages of prepaid calling cards, including eliminating a need to demonstrate good credit, without needing to enter lengthy codes.

However, it is often inconvenient for a user to pay for pre-purchased credits. Credit card payments offer quick processing time because the credit card information may be entered directly into a payment system, such as through a computer network or by a customer service representative who is given the credit card information over the phone or at a retail store. Although it is relatively easy for some users to pay for pre-purchased credits by giving a credit card to a communications company, other users may not own credit cards. Typically, toll blocked users have poor credit, and are more likely to not have access to credit cards. If a user does not have a credit card, the pre-purchased credits can be paid for by sending a check or money order to a communications company. The processing time of the payment is generally inconveniently long using this method of payment. The payment is often sent through the mail, which can take several days. Processing time is also increased because checks and money orders must be examined and entered into a payment system. It may also take additional time for money to be transferred by a check or money order.

Still another conventional method for charging users for communications includes "unlimited" communications usage in exchange for a periodic fee. This method is common in selling Internet access. A user typically pays a monthly fee in exchange for unlimited access to a communications network, such as the Internet.

While users who pay for communications services with such a method know exactly how much will be due on a periodic billing statement, users often have the perception that they are paying for communications services that they are not using. While this method of payment may be convenient for users who spend many hours per month connected to the Internet, a user who only uses the Internet for an average of a few minutes per month would probably prefer to pay a per minute rate. However, a per minute rate involves the uncertainties of the fees and rates, and generally requires a good credit rating.

Another disadvantage of the current methods of payment exists when several people share the same telephone line, but wish to pay for telephone services individually. This situation is common among roommates. Users in this situation must either purchase calling cards or manually split up the billing statement. If the billing statement is split between individuals, there is no way for the communications service provider to know who incurred which bill, and often one or both individuals will be liable for the entire amount.

Still another disadvantage of the current methods of payment exists when one individual is paying for communications services in two or more households. Such an individual receives separate billing statement for each service, and each billing statement has the disadvantages discussed above of the payment method used. In addition, the individual paying for the service may be paying for communications services used by other individuals, such as the common situation where a parent pays for communications services for a child who is living at a separate residence. The individual paying for the service often has no way of restricting the services available to the other individuals, which can be especially problematic if a per minute rate is charged after the services have been provided. A common scenario is a parent being surprised by the phone bill that his or her child has incurred.

These and other problems are avoided and numerous advantages are provided by the methods and systems of the present invention.

SUMMARY OF THE INVENTION

According to the present invention, a code corresponds to a payment amount for prepaid credit. By correlating the payment amount and a code, convenient methods of payment are enabled. In one embodiment, a system receives an origination number and a code. The origination number is any identifying number that designates the origination of a communications connection. Examples of an origination number include a phone number or a unique hardware identifying number such as a Media Control Access ("MAC") address or Internet Protocol ("IP") address. The code corresponds to a predefined payment amount for prepaid credit. The system credits an account associated with the origination number with the predefined payment amount for prepaid credit.

The system may receive the origination number and code through several sources convenient to consumers, for example, a retail establishment or an automated vending machine. The methods and systems disclosed herein provide convenient payment for prepaid credits and eliminate the need for credit cards or lengthy processing times caused by mailing payments. The credits may then be used for communications services. Various methods and systems for using the prepaid credit are discussed in detail co-pending application Ser. No. 10/008,888, entitled, "Method and System for Prepaid Communications Credit."

For clarity and ease of presentation, reference is made herein to "calls." By a "call" it is meant a communication connection between devices in a communications network. Calls may include wired or wireless telephone calls, or telephone calls made through other communications networks such as Ethernet or cable connections. Any communications connection may be substituted herein for a "call," including any device that connect to a communications network, such as computer "dial-up" Internet connections, e-mail, local area networks ("LAN"), wide area networks ("WAN"). Any communications network may also be substituted, including Ethernet, cable, or digital subscriber lines ("DSL"). Devices that make communications connections include any device that connects to a communications network, such as computers, hand-held devices sold under the trade name Palm™, telephones, cellular phones, and devices for receiving and transmitting e-mail.

In one aspect, a method according to the present invention includes receiving an origination number and a code. The code corresponds to a predefined payment amount for prepaid credit. A system then credits an account associated with the origination number with the predefined payment amount for prepaid credit. Preferably, when a communications connection, such as a phone call or computer network connection, is made from the received origination number, the cost of the communications connection is deducted from the payment amount for prepaid credit in the account.

In another aspect, if a predefined condition is detected, the cost of the communications connection is deducted from the payment amount for prepaid credit in the account. Preferably, the predefined condition includes detecting that the communications connection originates from the received origination number. The predefined condition may also include detecting a predefined destination number.

In yet another aspect, a system discontinues the communications connection if the cost of the communications connection is greater than the payment amount for prepaid credit in the account.

In yet another aspect of the invention, a computer readable medium includes a first set of instructions for receiving an origination number and a second set of instructions for receiving a code. The code corresponds to a predefined payment amount for prepaid credit. The computer readable medium includes a third set of instructions for crediting an account associated with the origination number with the predefined payment amount for prepaid credit. Preferably, when a communications connection is made, for example, from a received phone number, the cost of the communications connection is deducted from the payment amount for prepaid credit in the account. The computer readable medium may be a diskette, compact disk or hard drive.

Embodiments of the present invention offer many advantages. Various embodiments allow a user to conveniently pre-purchase credit for payment of communications services, eliminating long processing times caused by check or money order payment without requiring a credit card. The credit may be used for communications services, as described in more detail in co-pending application Ser. No. 10/008,888 entitled, "Method and System for Prepaid Communications Credit."

These and other advantages will become apparent to those of ordinary skill in the art with reference to the detailed description and drawings.

DETAILED DESCRIPTION OF THE INVENTION

According to an embodiment of the present invention, methods and systems for paying for prepaid communications credits are provided. In one embodiment, a system receives an origination number and a code. The code corresponds to a predefined payment amount for prepaid credit. The system credits an account associated with the origination number with the predefined payment amount for prepaid credit. The system may receive the origination number and code through several sources convenient to consumers. For example, a retail establishment can sell the credit for cash and confirm that payment has been received. The retail establishment then sends the origination number and a code that corresponds to the payment amount to the system. Because payment has been verified at the retail establishment, the prepaid credit is processed without the need to wait for money to be transferred or payments to be sent by mail.

Another example of a source for sending an origination number and code to the system involves purchasing the code and directions regarding how to send the code and a phone number to the system. A user purchases the code, for example, at a retail establishment or at a vending machine. The code and instructions for entering the code may be on a card or receipt. The user then sends the code and an origination number of the user's choosing to the system, for example, through a voice mail system or a computer system.

The methods and systems disclosed herein offer convenient payment for prepaid credits without the use of credit cards or lengthy processing times caused by mailing payments. The credits may then be used for communications services. Examples of methods and systems for using the prepaid credit are discussed in detail co-pending application Ser. No. 10/008,888, entitled, "Method and System for Prepaid Communications Credit."

For clarity and ease of presentation, reference is made herein to a telephone network through which telephone calls may be placed. As would be understood by one of ordinary skill in the art, the present invention may be applied to any network, for example, a wireless or wired telecommunications or computer network where users are allowed to connect to the network from various locations. Any communications connection may be substituted for a "call." The origination number may be a phone number or any other number that designates the origination of a communications connection, such as a Media Access Control ("MAC") address on a communications device, for example, a computer connected to a network.

Figure 1:
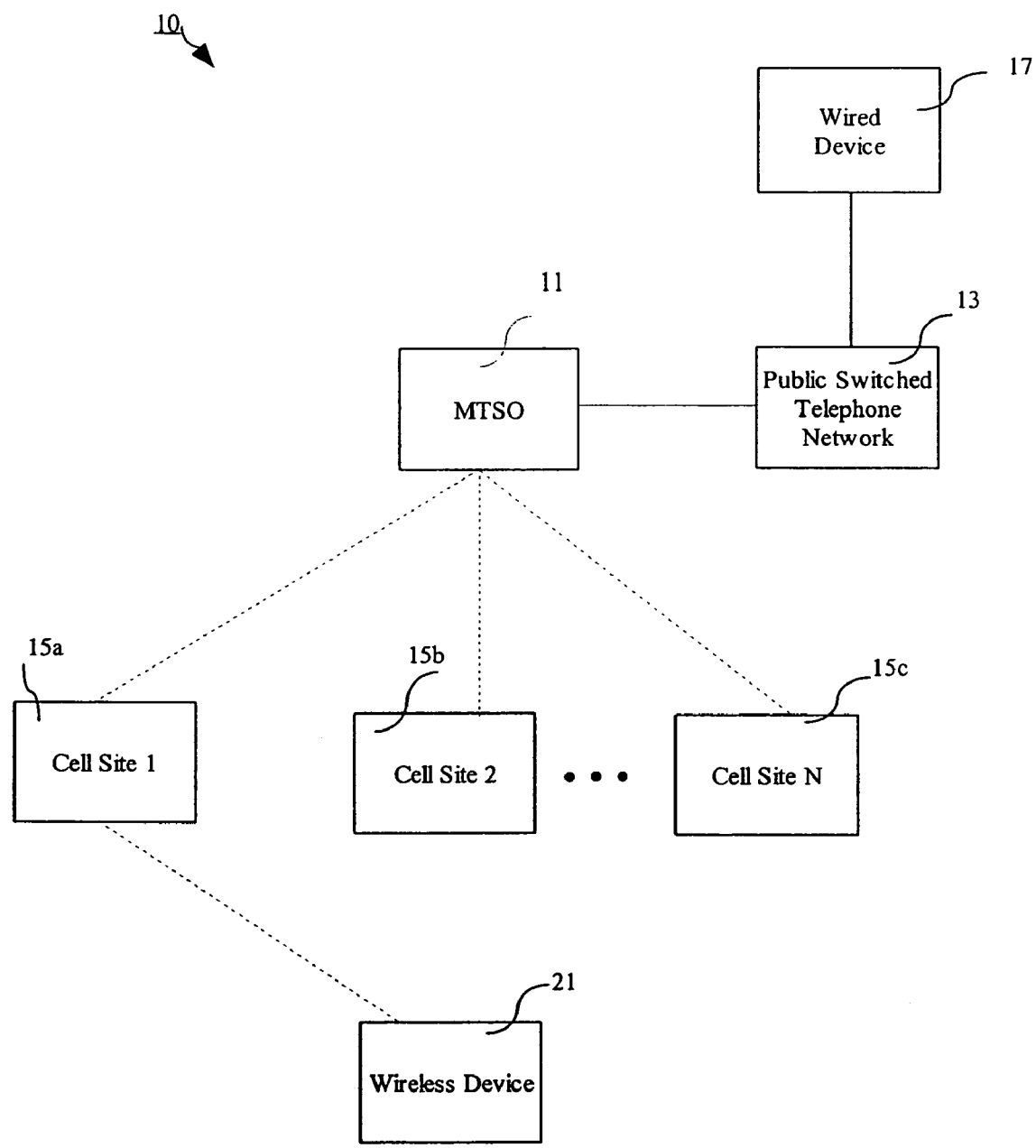
FIG. 1 is a block diagram of an exemplary telephone network.

FIG. 1 shows an exemplary telephone network. An overview of wireless telephone networks is provided in more detail in U.S. Pat. No. 5,850,606 to Bedingfield et al., which is hereby incorporated by reference.

For clarity and ease of presentation, an example of a telephone network, including both wireless and wired devices, is depicted in FIG. 1. As will be readily appreciated by those of ordinary skill in the art, the invention is applicable to wireless, wired, and other types of communication networks. For example, the invention is easily modified for use in a computer network. Any number of network configurations may be used to implement the system and method disclosed herein. It is not necessary that a particular wireless or wired telephone or other network configuration is used.

In the network 10 depicted in FIG. 1, a mobile wireless device 21 communicates with other telephones and compatible electronic equipment through one or more mobile telephone switching offices ("MTSO") 11 and cellular sites 15a-15n. The MTSO 11 establishes voice or other communications such as text communications with other telephones and compatible electronic equipment within the coverage area. As is known to those skilled in the art, the wireless device 21 passes through various cellular sites 15a-15n under the control of the MTSO 11 based on the geographic movement of the wireless telephone user. Each cellular site 15a-15n contains a transmitter and a receiver for communicating voice and data signals directly to and from the MTSO 11 and the wireless device 21 while the wireless device 21 is within the transmission range of a particular cellular site 15a. As the wireless device 21 is moved outside the range of cellular site 15a, it is transferred to a second cellular site such as cellular site 15b. The MTSO 11 controls the wireless device 21 as it passes through the various cellular sites 15a-15n.

The MTSO 11 controls a number of cellular sites and has a geographic range for tracking and monitoring wireless telephones. The MTSO 11 depicted in the network 10 is connected to a public switched telephone network 13. A wired device 17 is connected to the public switched telephone network 13. Both the connection between the MTSO 11 and the public switched telephone network 13 may be a wired connections or may be wireless connections. The wired device 17 can be a wireless mobile telephone, or a wired telephone, or any device compatible with the telephone network such as personal computers (PC's) or other electronic devices.

Figure 2:
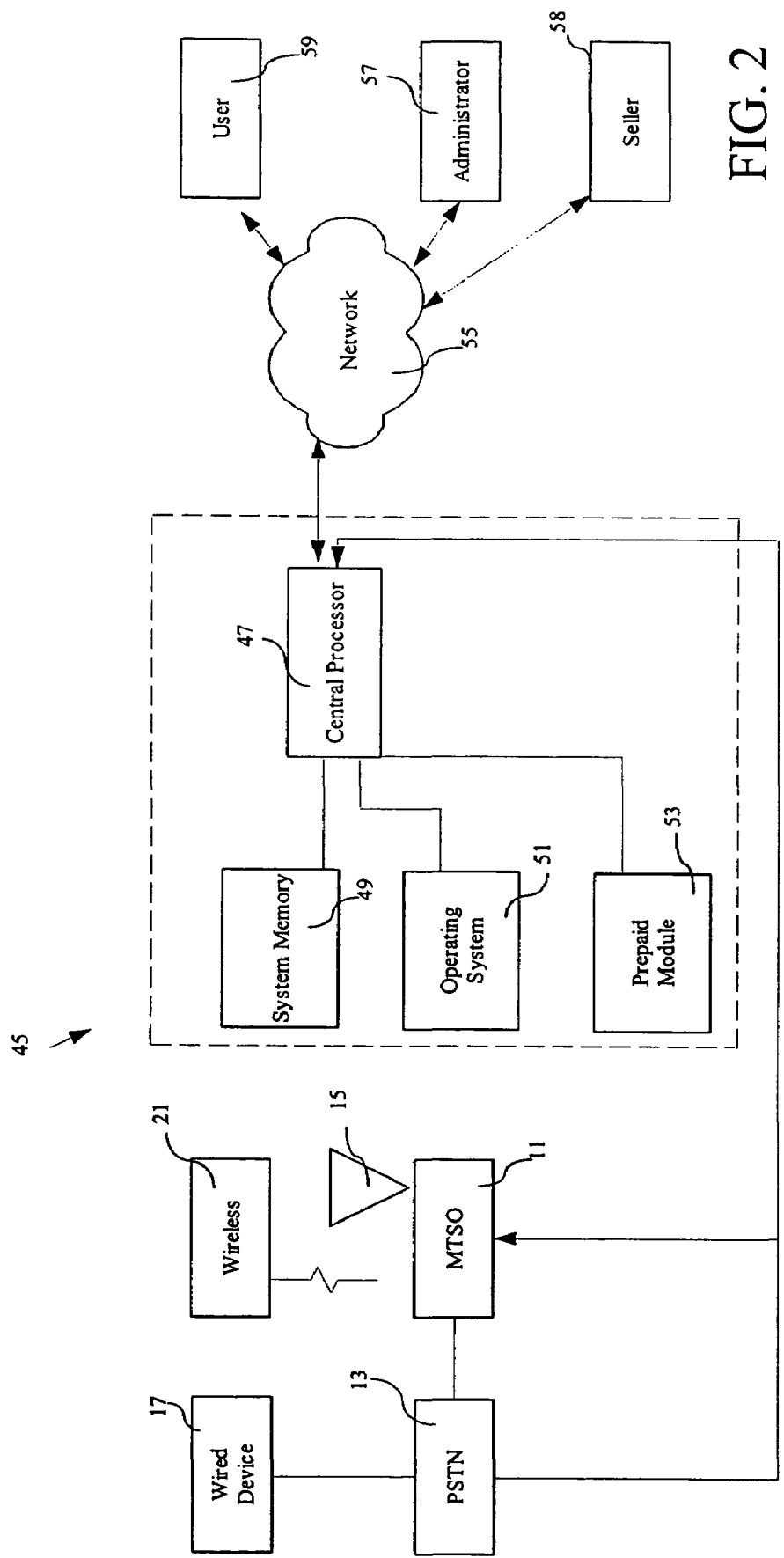
FIG. 2 is a block diagram of an exemplary computer system and telephone network for implementing the invention.

FIG. 2 is a block diagram which depicts an embodiment of a system according to the present invention. The system has a PSTN 13 that is in communication with a wired device 17, a wireless device 21, a cellular site 15, and an MTSO 11. The PSTN 13, wireless device 21, MTSO 11, wired device 17, and cellular site 15 may be part of a network of other MTSOs, wireless and wired devices, and cellular sites, such as the network shown in greater detail in FIG. 1.

The MTSO 11 is in communication with a computer system 45 through a central processor 47 that resides on the computer system 45. The computer system 45 has system memory 49 for storing data. An operating system 51 is loaded onto the computer system 45 for running and controlling application software. The prepaid module 53 is an example of an application that is run by the operating system 51. The prepaid module 53 is a computer readable medium, such as a diskette, compact disc, or hard drive. The prepaid module 53 is described in greater detail below.

The central processor 47 of the computer system 45 is also in communication with a computer network 55. The computer network 55 allows communication between the computer system 45 and other computer systems or terminals that may be connected to the computer network 55. Examples of terminals that may be connected to the computer network 55 include the user terminal 59, the administrator terminal 57, and the seller terminal 58. Specifically, the user terminal 59, administrator terminal 57, and seller terminal 58 may send code information or phone numbers to the prepaid module 53 through the network 55 and central processor 47. The seller terminal 58, user terminal 59 and administrator terminal 57 may include a receiver for receiving a code from a magnetic strip or computer chip on a card or a terminal or other device for entering information into a system.

The system depicted in FIG. 2 allows data, such as call information, voice transmissions, and text messages, from the wireless device 21 to be transmitted from the cellular site 15 and an MTSO 11 to a computer system 45. Alternatively, data is transmitted from a wired device and PSTN 13 to the computer system 45. The data is stored in the system memory 49, and/or processed by the prepaid module 53, which is run and controlled by the operating system 51. The central processor 47 communicates the data or other information derived from the data to a computer network 55, where it may be accessed at a user terminal 59 or an administrator terminal 57. Thus, a user or administrator can track the usage of the wireless device 21 from the user terminal 59 or administrator terminal 57, respectively.

In an embodiment of a system for implementing a method according to the present invention, the prepaid module 53 comprises a software program or computer readable medium for storing and tracking the user's prepaid account. The network system depicted in FIG. 2 is an example of the environment in which the prepaid module is operated. As would be understood by one of ordinary skill in the art, alternative networks may be implemented. In an alternative embodiment, the computer system 45 and the user terminal 59 could be a single computer, which receives and processes the data (using the prepaid module 53) from the wireless device 21 or wired device 17 directly. In another embodiment, a telephone network is substituted for the computer network 55 and a telephone is substituted for the user terminal 59. The user dials a telephone number, which connects the user to a voice mail system through a telephone network. Information from the computer system 45 is communicated to the user through the voice mail system, which may be a conventional voice mail service. In yet another embodiment, the wireless device 21 contains a processor chip that runs the prepaid module 53 on the wireless telephone itself. In this embodiment, the wireless device 21 has a display through which the user can access information about calling usage processed by the prepaid module 53. Thus, the computer network 55, computer system 45 and user and administrator terminals 59 and 57 are eliminated.

Figure 3:
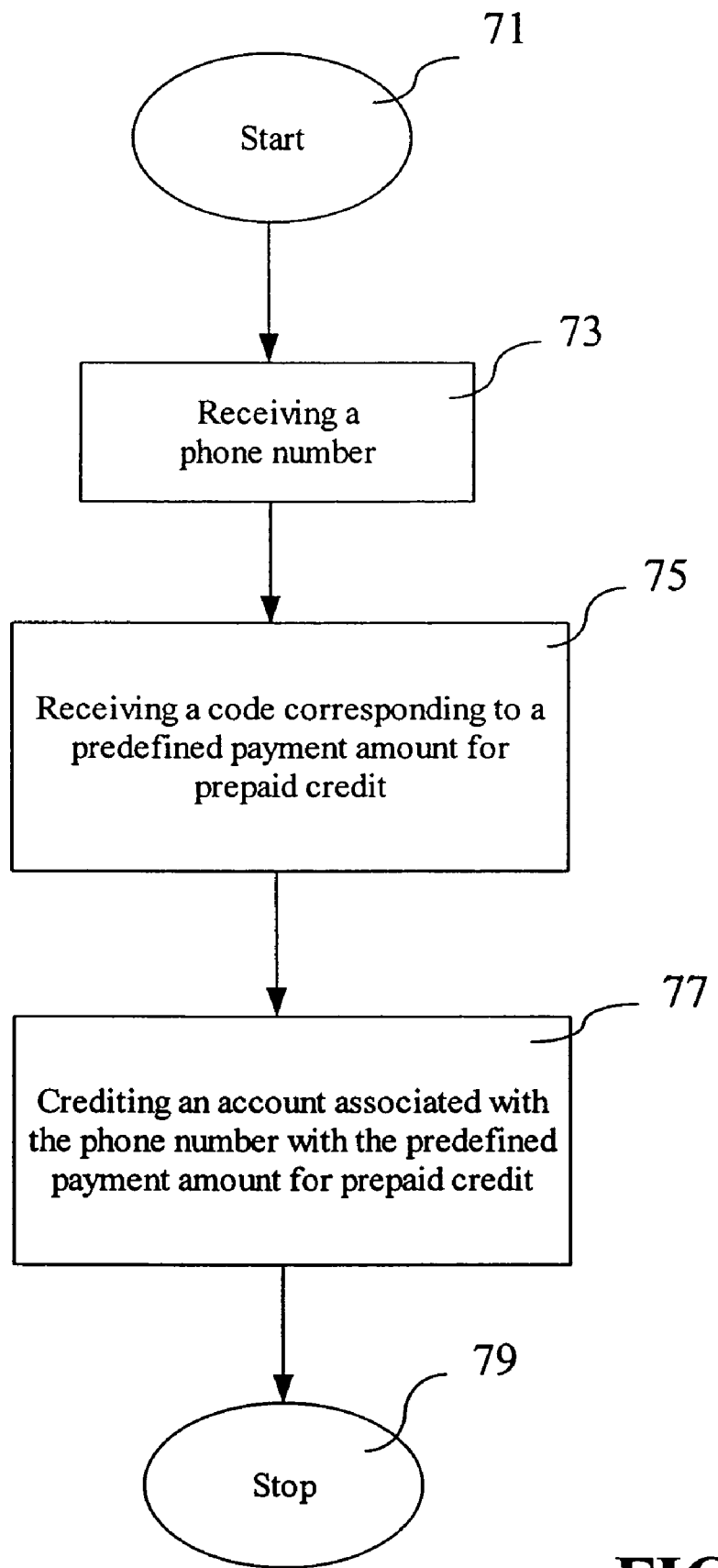
FIG. 3 shows the flow of an embodiment of a method according to the present invention.

One embodiment of the operation of the prepaid module 53 shown in FIG. 2 is depicted in FIG. 3. Referring to FIG. 3, the prepaid module starts at step 71 and receives a phone number at step 73. The prepaid module then receives a code corresponding to a predefined payment amount for prepaid credit at step 75. The code is a series of characters or other identifying information that corresponds to a predefined amount of prepaid credit. The prepaid module includes a list or table of codes and corresponding prepaid credit amounts. The prepaid module credits an account associated with the received phone number with the predefined payment amount for prepaid credit at step 77. For example, the prepaid module creates an account for the user, which includes the phone number and the amount of credit associated with the code, or if the user has an existing account, the amount of credit associated with the code is added to the amount of credit that is in the existing account. The account may also include information about the user, such as the user name, address, and alternative phone numbers. Multiple user account may be stored in a database in communication with the prepaid module. The code and phone number may be entered into the prepaid module 53 shown in FIG. 2 by the user terminal 59, seller terminal 58 or administrator terminal 57 through the network 55.

Methods and systems for sending the code and phone number to the prepaid module include a seller terminal 58 as shown in FIG. 2. The seller terminal 58 may be located at a retail establishment. For example, the code is purchased by a user, and a clerk enters the code and a phone number of the user's choosing into a seller terminal 58 located at the retail establishment. Alternatively, the code may be purchased by a user at an automated vending machine. The user may enter the code and a phone number of the user's choice from a user terminal 59 or a seller terminal 58 located near the vending machine. The user terminal may be a computer terminal connected to the network 55. Alternatively, the user may enter the code and a phone number of the user's choice from a wired device 17 or wireless device 21 that is connected to the prepaid module 53 through the central processor 47 by a PSTN 13 or cellular site 15 and MTSO 11.

The prepaid credit may be used to pay for communications services. Various methods and systems of paying for communications services using the prepaid credit are discussed in detail co-pending application Ser. No. 10/008,888, entitled, "Method and System for Prepaid Communications Credit."

Figure 4:
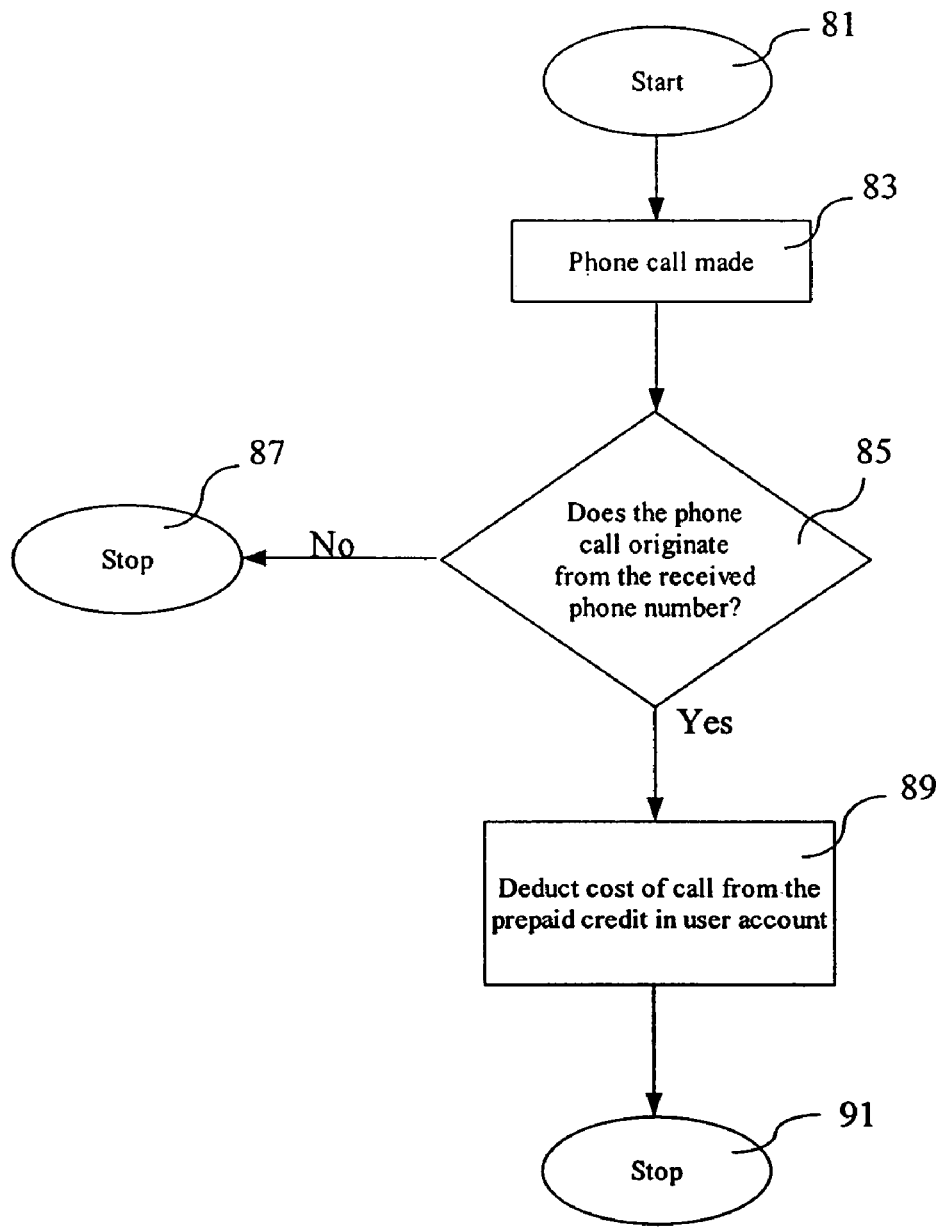
FIG. 4 shows an alternative embodiment of a method according to the present invention.

Another embodiment of the operation of the prepaid module 53 shown in FIG. 2 is depicted in FIG. 4. The flow shown in FIG. 4 is a continuation of the result of the steps shown in FIG. 3. Once the steps shown in FIG. 3 have been performed, the prepaid module begins at step 83 in FIG. 4. A user makes a call at step 83. The prepaid module detects the origination source of the call, and if the phone call originates from the received phone number at step 85, the prepaid module stops at step 87. If the call originates from the received phone number at step 85, the prepaid module deducts the cost of the call from the prepaid credit in the user account at step 89. The prepaid module stops at 91.

Figure 5:
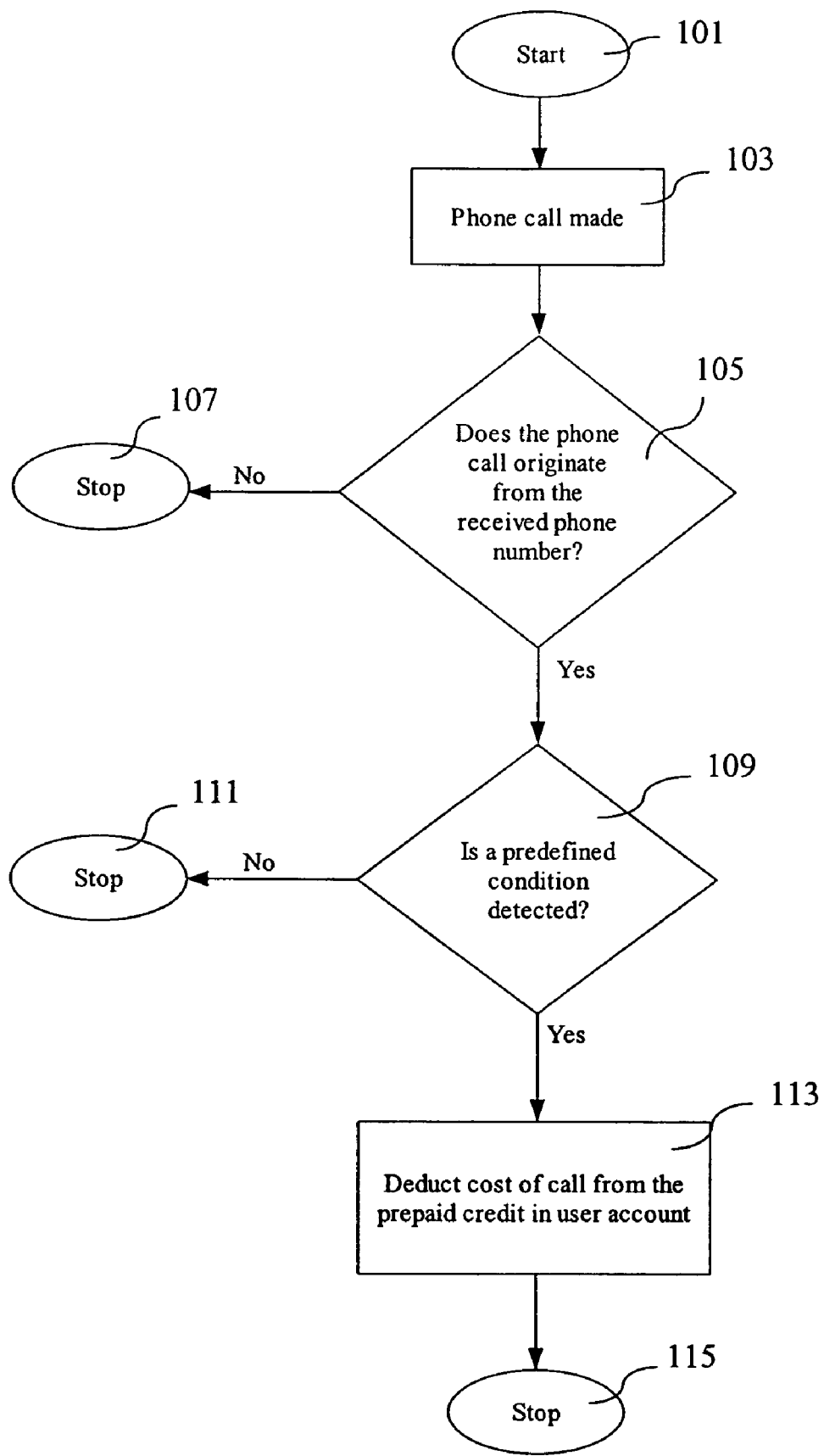
FIG. 5 shows another alternative embodiment of a method according to the present invention.

Yet another embodiment of the operation of the prepaid module 53 shown in FIG. 2 is depicted in FIG. 5. The flow shown in FIG. 5 is a continuation of the flow from FIG. 3. The prepaid module starts at step 101 and the user makes a call at step 103. The prepaid module detects the origination source of the call, and if the phone call originates from the received phone number at step 105, the prepaid module stops at step 107.

The prepaid module then detects if a predefined condition is detected at step 109. If a predefined condition is not detected at step 109, the prepaid module stops at step 111. If a predefined condition is detected at step 109, the prepaid module deducts the cost of the call from the prepaid credit in the user account at step 113. The prepaid module stops at 115.

A predefined condition may be used to limit the communications services for which the prepaid credit may be applied. Examples of predefined conditions include detecting that the call originates from the received phone number, detecting that the call is a toll call, and detecting that the call is a predefined destination number. Referring to FIG. 2, the predefined conditions may be received by the prepaid module 53 from the user terminal 59, the administrator terminal 57, or the seller terminal 58 through the network 55 and central processor 47. The predefined conditions may also be received by the prepaid module 53 from a wireless device 21 through a cellular site 15 and MTSO 11 or from a wired device 17 through a PSTN 13 in communication with the central processor 47.

Figure 6:
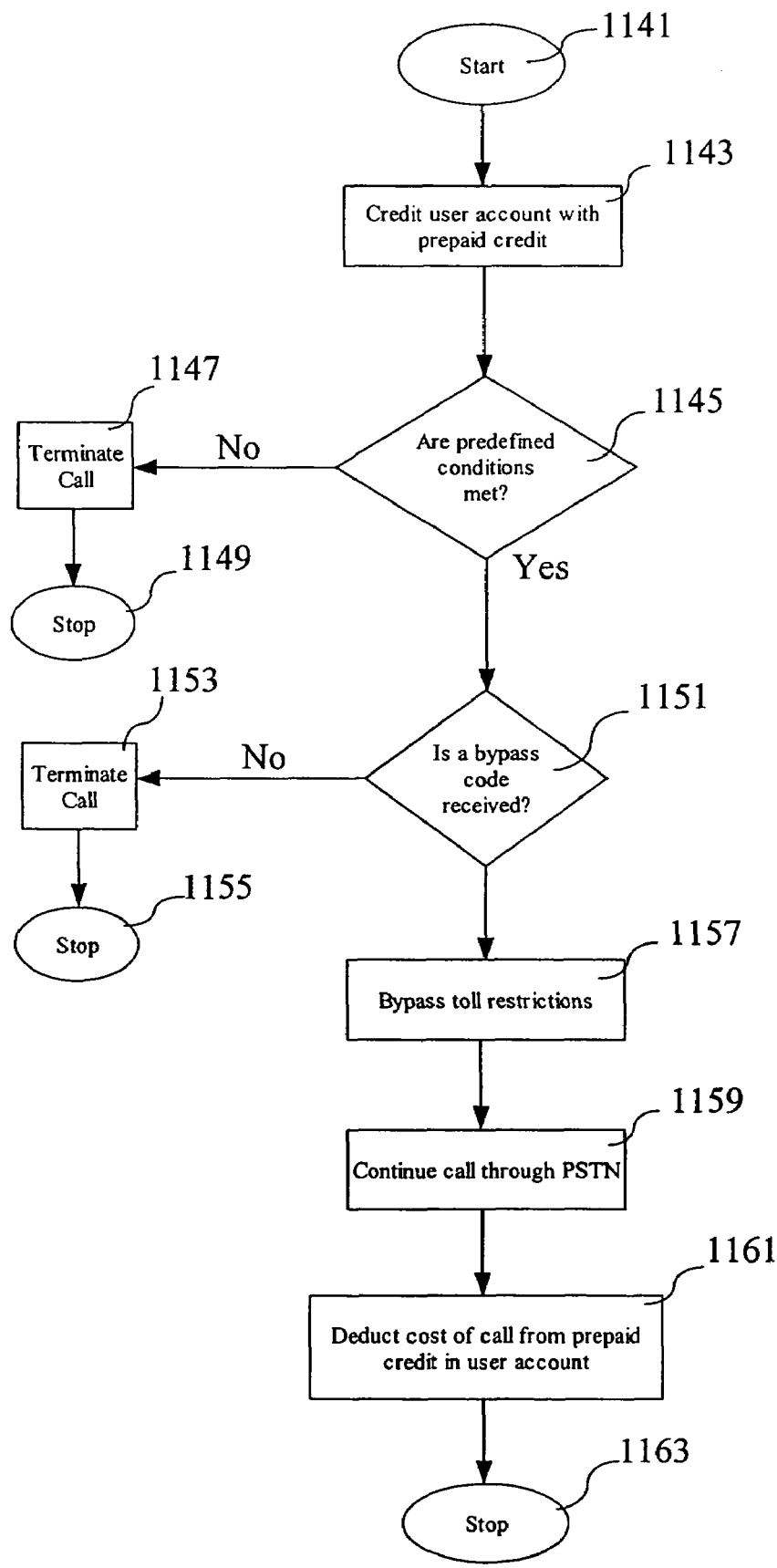
FIG. 6 shows yet another alternative embodiment of a method according to the present invention.

Another embodiment of the flow of the prepaid module 53 shown in FIG. 2 is depicted in FIG. 6. The prepaid module begins at step 1141. The prepaid module credits a user account with prepaid credit at step 1143. The prepaid module may receive credit and other information using the method depicted in FIG. 3. The prepaid module detects a predefined condition of a call and determines of the predefined condition is detected at step 1145. If the predefined conditions are not met at step 1145, the call is terminated at step 1147 and the prepaid module stops at step 1149. At step 1151, the prepaid module checks whether a bypass code was received. A bypass code is a code that enables the network to bypass toll restrictions. If a bypass code is not received, the call is terminated at step 1153 and the prepaid module ends at step 1155.

If the bypass code is received at step 1151, then toll restrictions are bypassed at step 1157. The call is continued through the PSTN at step 1159. The cost of the call is deducted from the prepaid credit in the user account at step 1161, and the prepaid module stops at step 1163.

Figure 7:
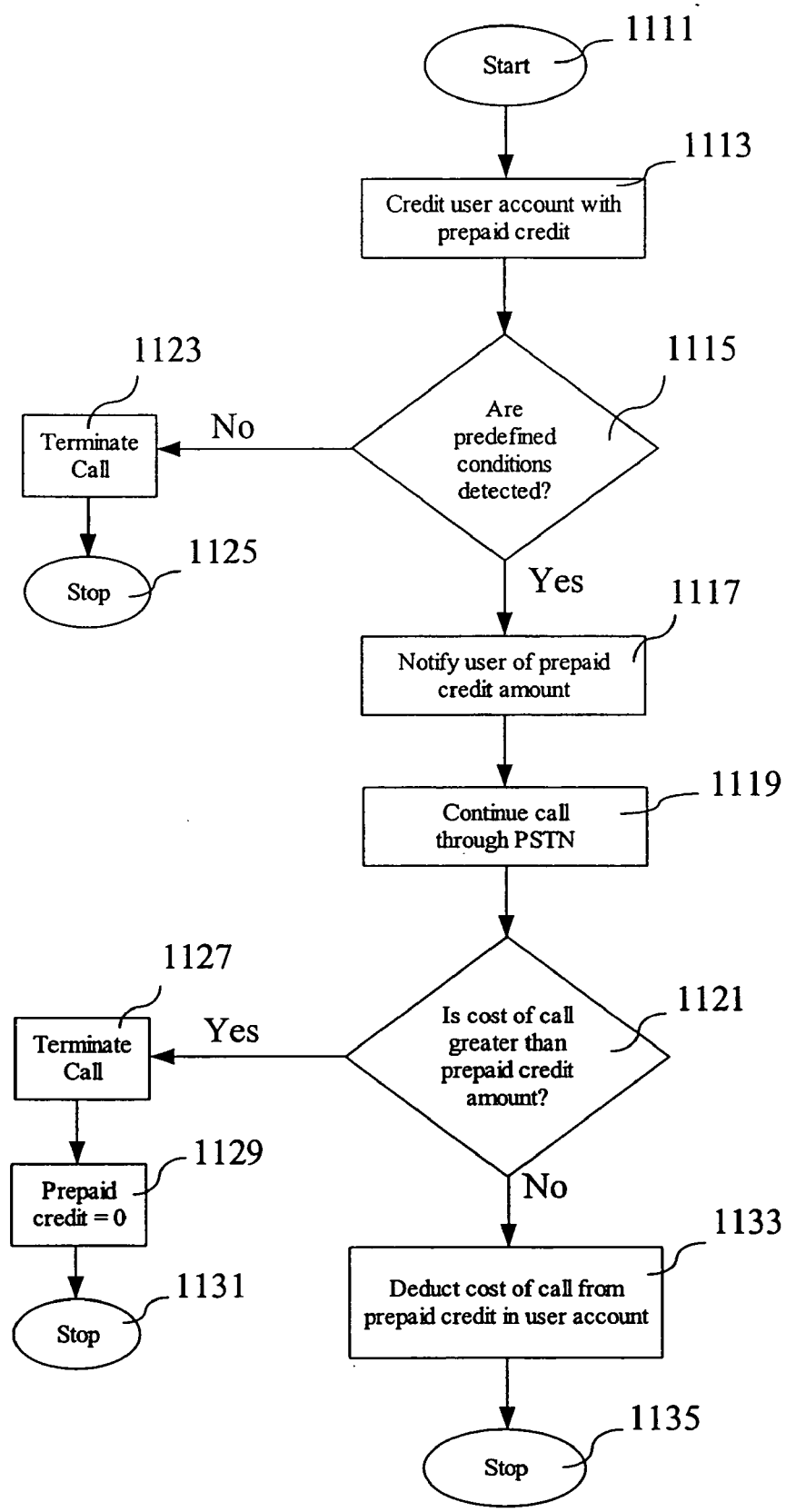
FIG. 7 shows still another an alternative embodiment of a method according to the present invention.

Yet another embodiment of the flow of the prepaid module 53 shown in FIG. 2 is depicted in FIG. 7. The prepaid module starts at step 1111 and credits the user account with prepaid credit at step 1113. For each call that is made, the prepaid module detects whether predefined conditions are present. If a predefined condition is not detected at step 1115, the prepaid module terminates the call at step 1123.

If a predefined condition is detected at step 1115, the prepaid module notifies the user of a prepaid credit amount at step 1117. This notification may occur by a recorded voice message at the beginning of the call. Alternatively, a user can check how much prepaid credit is in the user's account by accessing the prepaid module through the network 55 from the user terminal 59 depicted in FIG. 2.

Referring back to FIG. 7, the call is continued through the PSTN at step 1119. During the call, the prepaid module checks whether the cost of the call is greater than the prepaid credit amount. If the cost of the call is greater than the prepaid credit amount at step 1121, than the prepaid module terminates the call at step 1127 and sets the prepaid credit in the account to zero at step 1129. The prepaid module then ends at step 1131.

If the cost of the call is not greater than the prepaid credit amount at step 1121, then the prepaid module deducts the cost of the call from the prepaid credit in the user account at step 1133. The prepaid module stops at step 1135.

Figure 8:
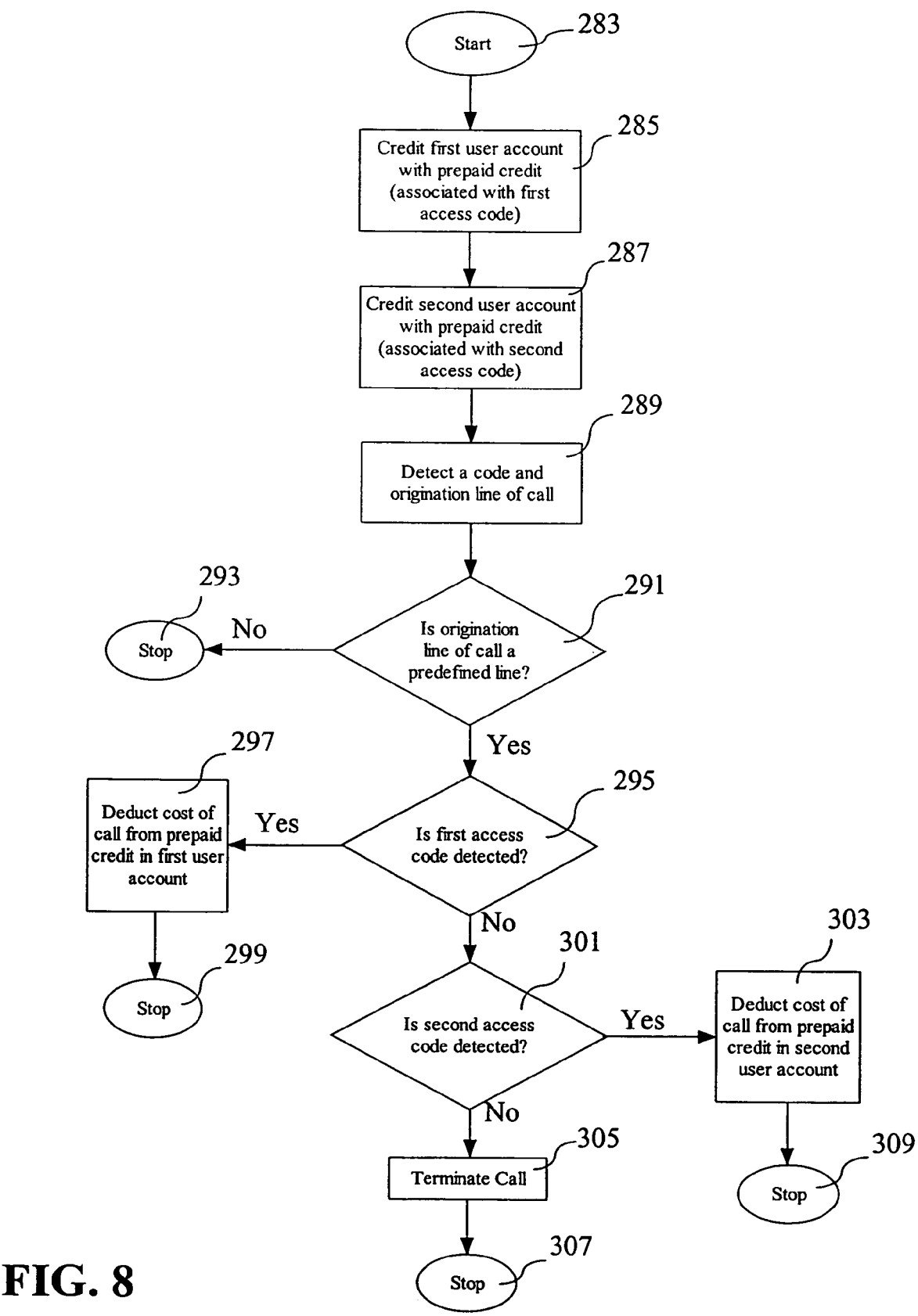
FIG. 8 shows yet another an alternative embodiment of a method according to the present invention.

Yet another embodiment of the flow of the prepaid module 53 shown in FIG. 2 is depicted in FIG. 8. The prepaid module starts at step 283 and credits a first user account with prepaid credit at step 285. The first user account includes a first access code associated therewith. The prepaid module then credits a second user account with prepaid credit at step 287. The second user account includes a second access code associated therewith.

The prepaid module then detects a code and an origination line of a call at step 289. If the origination line is not a predefined line at step 291, then the prepaid module stops at step 293 and the call is processed through the normal PSTN. If the first access code is detected at step 295, the prepaid module deducts the cost of the call from the prepaid credit in the first user account at step 297. The prepaid module stops at step 299. If the first access code is not detected at step 295, then the prepaid module checks whether the second access code is detected at step 301. If the second access code is detected at step 301, then the prepaid module deducts the cost of the call from the prepaid credit in the second user account at step 303, and stops at step 307. If the second access code is not detected at step 301, the prepaid module terminates the call at step 305 and stops at step 307.

It will be apparent to those with skill in the art that there are many alterations that may be made in the embodiments of the invention described above without departing from the spirit and scope of the invention. For example, there are many ways that circuits and electronic elements may be combined to implement the method and system described herein in various systems and hardware environments. The present invention may be implemented in various network environments, including wireless and computer networks, or other networks supporting electronic devices. There are similarly many ways that independent programmers might provide software to provide the functionality associated with the present invention as taught herein without departing from the spirit and scope of the invention. Having thus generally described the invention, the same will become better understood from the following claims in which it is set forth in a non-limiting manner.

That which is claimed:

1. A method for purchasing prepaid communications credit, comprising:
   receiving an origination number;
   creating a plurality of user accounts associated with the origination number, wherein each of the plurality of user accounts is associated with a different access code;
   receiving a credit code, wherein the credit code corresponds to a predefined payment amount for prepaid credit for each of the plurality of user accounts;
   receiving an access code;
   crediting the user account associated with the received access code with the predefined payment amount for prepaid credit; and
   deducting a cost associated with a communications service from the payment amount for prepaid credit from the user account.

2. The method of claim 1, wherein the origination number comprises a phone number.

3. The method of claim 1, wherein the origination number comprises a media access control (MAC) address.

4. The method of claim 1, wherein the origination number comprises at least one of an Internet Protocol address, a circuit identifier, a main billed telephone number, or a master account number.

5. The method of claim 1, wherein the communications service comprises at least one of a phone call, a wireless service, a VoIP service, broadband service, or Internet service.

6. The method of claim 1, further comprising if a predefined condition is detected, deducting the cost associated with the communications service from the payment amount for prepaid credit from the user account.

7. The method of claim 6, wherein the predefined condition comprises that communication originates from the received origination number.

8. The method of claim 6, wherein the predefined condition comprises that the communication originates from the received origination number and the communication requires payment.

9. The method of claim 6, wherein the predefined condition comprises detecting a predefined destination number.

10. The method of claim 9, wherein the destination number comprises a phone number.

11. The method of claim 1, further comprising if the communication originates from the received origination number and the received origination number comprises a toll blocked phone number, discontinuing the communication if the cost associated with the communications service is greater than the payment amount for prepaid credit from the user account.

12. The method of claim 1, further comprising charging the cost associated with the communications service that exceeds the payment amount for prepaid credit in the account to an owner of the origination number.

13. The method of claim 1, further comprising if a communication originates from the received origination number and the received origination number is not a toll blocked phone number, charging the cost associated with the communications service that exceeds the payment amount for prepaid credit from the user account to an owner of the origination number.

14. The method of claim 1, further comprising receiving the credit code from a retail establishment.

15. The method of claim 1, further comprising receiving the credit code from a magnetic strip on a card.

16. The method of claim 1, further comprising receiving the credit code through a voice mail system.

17. The method of claim 1, further comprising receiving the credit code through a computer network.

18. The method of claim 1, where in the access code comprises a wireless phone associated with a wireline origination number.

19. A method for purchasing prepaid communications credit, comprising:
   receiving an origination number;
   creating a plurality of user accounts associated with the origination number, wherein each of the plurality of user accounts is associated with a different access code;
   receiving a credit code, wherein the credit code corresponds to a predefined payment amount for prepaid credit for each of the plurality of user accounts;
   receiving an access code;
   crediting the user account associated with the received access code with the predefined payment amount for prepaid credit; and
   deducting a cost associated with a communications service from the payment amount for prepaid credit from the user account, wherein the communications service is implemented via a cable modem.

20. The system of claim 19, wherein the origination number comprises a phone number.

21. The system of claim 19, wherein the origination number comprises a media access control (MAC) address.

22. The system of claim 19, wherein the origination number comprises at least one of an Internet Protocol address, a circuit identifier, a main billed telephone number, or a master account number.

23. A propagated signal on a carrier detectable by a computing system and encoding data and a computer program of instructions for executing a computer process for purchasing prepaid communications credit, the computer process comprising:
   receiving an origination number;
   creating a plurality of user accounts associated with the origination number, wherein each of the plurality of user accounts is associated with a different access code;
   receiving a credit code, wherein the credit code corresponds to a predefined payment amount for prepaid credit for each of the plurality of user accounts;
   receiving an access code;
   crediting the user account associated with the received access code with the predefined payment amount for prepaid credit; and
   deducting a cost associated with a communications service from the payment amount for prepaid credit from the user account.

24. A computer program product comprising a computer usable medium having control logic stored therein for causing a computer to purchase prepaid communications credit, the control logic comprising computer readable program code for causing the computer to:
   receive an origination number;
   create a plurality of user accounts associated with the origination number, wherein each of the plurality of user accounts is associated with a different access code;
   receive a credit code, wherein the credit code corresponds to a predefined payment amount for prepaid credit for each of the plurality of user accounts;
   receive an access code;
   credit the user account associated with the received access code with the predefined payment amount for prepaid credit; and
   deduct a cost associated with a communications service from the payment amount for prepaid credit from the user account.

* * * * *